(No Model.) 2 Sheets—Sheet 2.

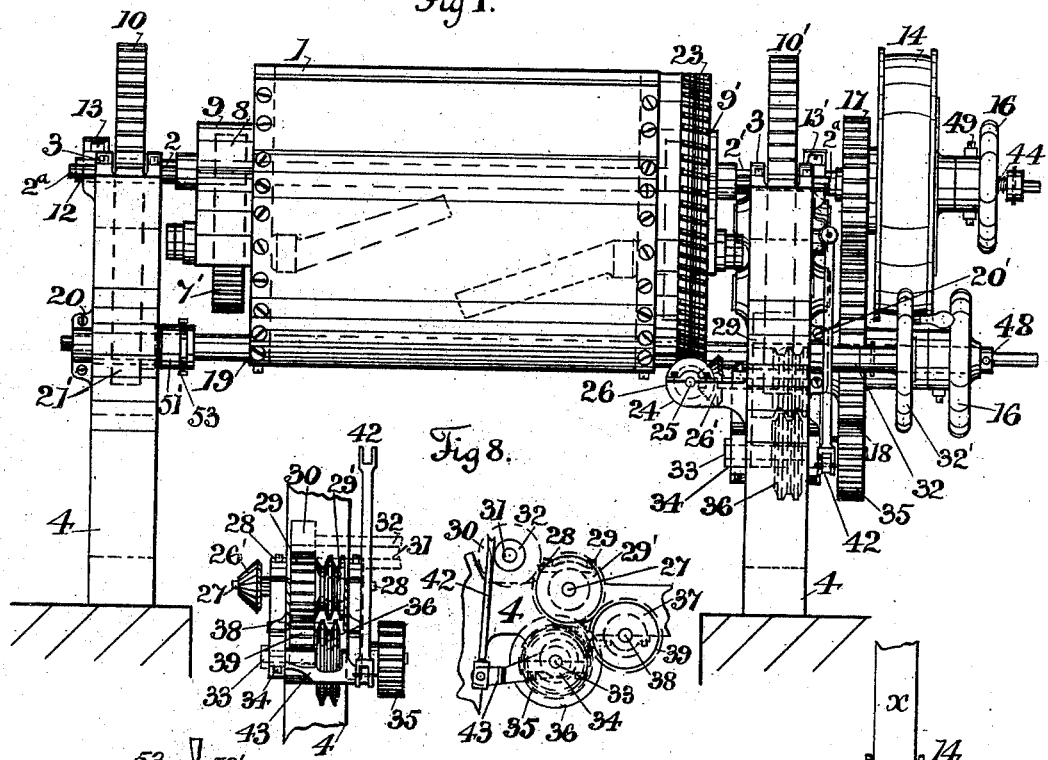

G. S. BAKER.
KNEADING MACHINE.

No. 502,392. Patented Aug. 1, 1893.

Witnesses.
W. Harry Muzzy
Wm R. Davis

Inventor.
Geo. Samuel Baker
by W. H. Babcock
Attorney.

UNITED STATES PATENT OFFICE.

GEORGE SAMUEL BAKER, OF LONDON, ENGLAND.

KNEADING-MACHINE.

SPECIFICATION forming part of Letters Patent No. 502,392, dated August 1, 1893.

Application filed February 8, 1893. Serial No. 461,471. (No model.)

*To all whom it may concern:*

Be it known that I, GEORGE SAMUEL BAKER, of the firm of Joseph Baker & Sons, 58 City Road, London, England, residing at 17 Craven Park, Harlesden, Willesden, London, England, have invented new and useful Improvements in Kneading-Machines, of which the following is a specification.

My invention relates to improvements in dough kneading machines and the objects of my improvements are to insure more thorough admixing of the material treated, and keep the material clear of the sides thereby diminishing friction and lessening labor. I attain these objects by the mechanism illustrated in the accompanying drawings, in which—

Figure 4:
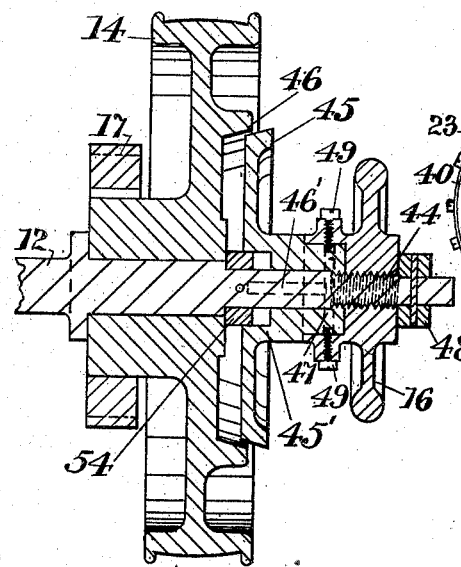
Figure 2:
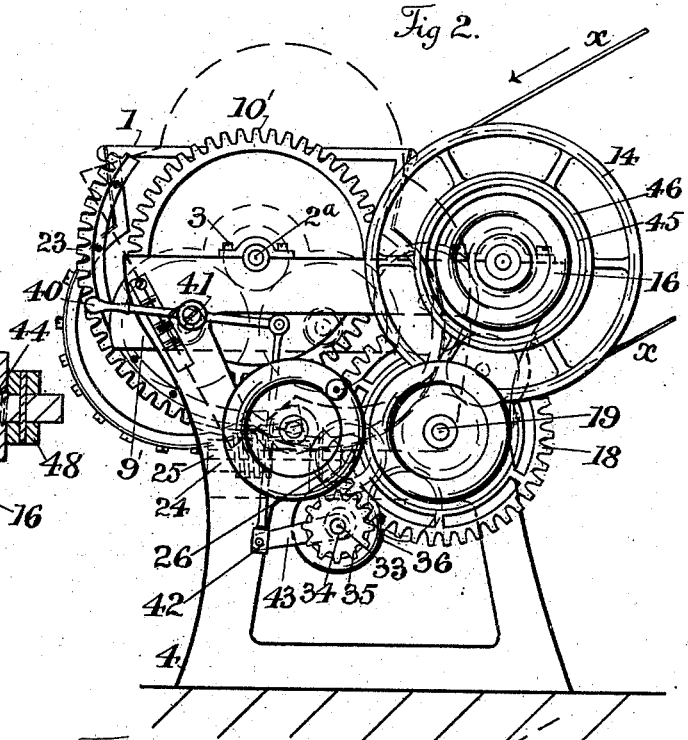
Figure 10:
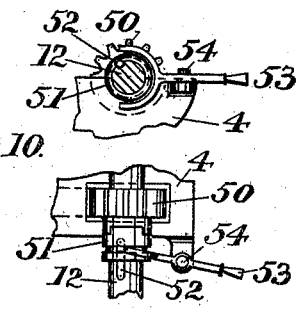
Figure 6:
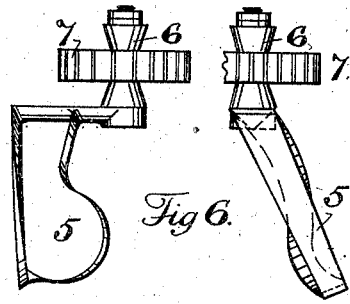
Figure 5:
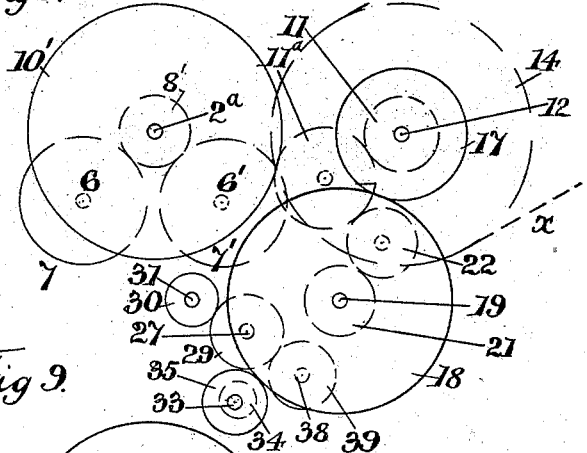
Figure 9:
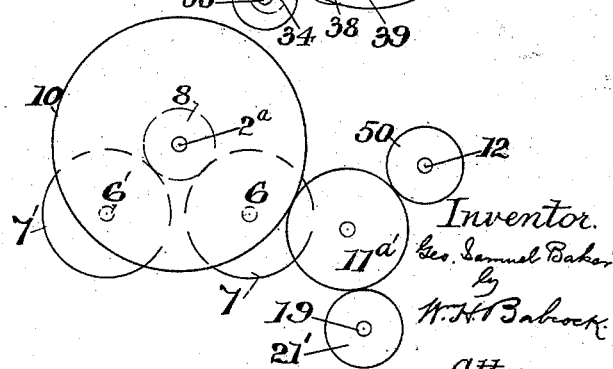

Figure 1. is a front elevation. Fig. 2. is a side elevation. Fig. 3. is a plan. Fig. 4. is a vertical section of friction clutch. Fig. 5. is a diagrammatic view of wheel train upon the right side of machine. Fig. 6. is a plan and side view of hollow mixing arm. Fig. 7. is a plan and side view of plain mixing arm. Fig. 8. shows in plan and elevation detail of V-shaped friction clutches employed in tilting the drum. Fig. 9. is a diagrammatic view of gearing on left hand side of machine. Fig. 10. is a plan and side elevation of slipping clutch and lever.

1. is the drum which is mounted upon trunnions or the like, 2, 2' seated in bearings 3, in the cast iron frame 4. This frame I prefer to make of hollow shape thereby securing strength with lightness. Moreover, I am enabled thereby to form the bearings as well as cover up some parts of the driving gear.

On either side within the drum mounted upon coned spindles 6, 6' (see Figs. 6 and 7) are the hollow and plain mixing arms 5, 5'. These generally revolve in the same direction upon one side of the drum; which however, is reverse to that of those upon the opposite side. Each spindle 6, 6', also carries and is actuated by a spur pinion 7, 7', (see Fig. 5) to which motion is imparted by means of driving pinions 8, 8', which are mounted upon a feather sunk in shaft $2^a$, which passes through the trunnions 2, 2'. Each pair of pinions 7, 7', as well as the two driving pinions 8, 8' are protected by a metallic covering 9, 9' on either side of the drum.

Keyed to shaft $2^a$ passing through the trunnions 2, 2' are the spur wheels 10, 10'. Motion is conveyed to these two wheels first, by means of the inclosed pinion $11^a$ (see Fig. 5.) and pinion 11, keyed to first motion shaft 12, which revolves in bearings 13, 13' upon either side of frame 4. This shaft also carries the single main driving pulley 14, and is fitted with a friction clutch, operated by hand wheel 16, and also a pinion 17, which is keyed on the hub of pulley 14, and gears with spur wheel 18. This wheel is also fitted with a friction clutch and is mounted upon a second motion shaft 19, revolving in bearings 20, 20' formed in or mounted upon both frames. Shaft 19, also carries pinion 21, which engages when the friction clutch upon the second motion shaft is in gear, with the pinion 22, engaging with $11^a$, which gears with trunnion wheel 10'. Slow motion is imparted to the mixing arms 5, 5', upon the opposite side of the drum by pinion 21' on shaft 19, which gears with pinion $11^{a\prime}$ and trunnion wheel 10, (see diagram Fig. 9) while the fastest motion is conveyed to mixing arms 5, 5' by pinion 11, engaging with $11^a$, which gears with 22, this latter causing pinion 21, to drive shaft 19, on which on the opposite side of frame is clutch pinion 21'. When in gear this pinion engages with $11^{a\prime}$ driving wheel 10.

To enable the drum to be tilted so as to receive or discharge its contents it is fitted with a circular screw rack 23. A worm wheel 24, mounted in bearings 25, upon the inner side of frame and at right angles to it is actuated by means of a pair of miter pinions 26, 26' (see Fig. 8.) the latter of which is keyed to shaft 27, mounted in bearings 28, within the frame and carrying the spur pinion 29, and V-shaped friction pulley 29'. The pinion 29, gears into a spur driving pinion 30, mounted on shaft 31, which passes through a bearing 32, formed in or mounted upon the frame. A hand wheel 32', is keyed to this shaft. It will be readily understood that by turning this hand wheel to the right or left hand the drum 1, can be turned over, as see dotted lines, Fig. 2, or can be made to occupy any other position. The drum may also be tilted by power as follows: Upon spindle 33, mounted in eccentric bearings 34, formed in or secured to the frame is a pinion 35, which receives motion from wheel 18, on shaft 19. Spindle 33, also carries a V-shaped friction pulley 36, which engages with friction pulley 29' and with a friction pulley 37, mounted upon a spindle 38, which also carries a spur wheel 39, engaging with the pinion 29, forming part of the hand gear. When the lever 40, pivoted to the framing at 41, and connected by the rod 42, with the forked lever 43, attached to the eccentric bearings 34, is depressed, the friction pulley 36, is raised and forced into contact with friction pulley 29'. The belt $x$ (see Figs. 2 and 3) or its equivalent will now transmit the power required through pinion 17, wheel 18, and pinion 35, thereby turning the drum into the position for emptying its contents. When on the other hand, lever 40 is raised, friction pulley 36, is disengaged from friction pulley 29' and engages with friction pulley 37, thereby restoring the drum to the vertical position or that most suitable for recharging. If the lever 40, is brought to the central position, friction pulley 36, is disengaged from both 29' and 37, and the trough is stationary.

The construction of the friction clutches mounted on shafts 12, 19, will be readily understood by reference to the detail shown in Fig. 4. The driving pulley 14, and spur wheel 17, keyed thereon are loose upon shaft 12, at the end of which a screw thread 44, is cut. The cone 45, is carefully turned to fit a corresponding recess 46, in pulley 14.

In the hub 45' of cone 45, which is mounted loosely but slides upon a feather 46' on shaft 12, is cut a channel 47. This hub 45' passes within a recess formed in hand wheel 16, which is run upon the screw thread 44, cut upon the end of shaft 12, and is prevented from coming off by a nut 48. Two screws 49, pass through the wall of recess in wheel 16, and pass into the channel 47, on the hub 45' of cone 45. By turning the hand wheel in one direction the cone 45, is withdrawn from the recess 46, in driving pulley 14, or wheel 18, and by turning it in the reverse direction the pulley 14, and wheel 17, are coupled to the shaft 12. This description applies equally to the operation of the coned clutch formed in wheel 18, mounted upon shaft 19. A collar 54, pinned on to shaft 12 and 19, prevents the pulley 14, or wheel 18, from shifting its position when the cone 45, is withdrawn.

The operation of my invention is as follows:—Flour and water in suitable proportion or the other material to be kneaded are put into the trough and the machine put in action. The coned clutch coupling upon pulley 14, is put in gear in the manner just described, while that upon wheel 18, mounted on shaft 19, is thrown out. The mixing arms 5, 5', are now driven at their highest rate of speed from the gear actuated by shaft 12, the wheel 18, running loose on shaft 19. As however, the material becomes plastic more power can be obtained by disconnecting pulley 14, from the shaft 12, and putting wheel 18, into gear, thereby augmenting the power. When both couplings are disengaged the pulley 14, runs free, but motion being conveyed through pulley 14, pinion 17, wheel 18, and pinion 35, the trough can be tilted whether the mixing blades are in motion or at rest by suitably operating lever 40.

It is occasionally convenient to reverse the motion of one set of blades, for instance, those shown at A, Fig. 3. In this case a clutch pinion 50, (see Fig. 10) running loose on shaft 12, and gearing with $11^{a\prime}$ which drives wheel 10, is connected to the shaft by means of the slipping part of clutch 51, which slides on a feather 52, sunk in shaft 12, operated by lever 53, pivoted to the frame at 54, which reverses the motion of the train when clutch pinion 21' coupled to shaft 19, by the slipping part of clutch 51', sliding on feather 52', sunk in shaft 19, and operated by lever 53' pivoted to frame 54' is thrown out of gear.

In some cases slipping clutches such as I have just described may replace the cone clutches shown on wheels 14, 18.

I claim—

1. In a machine for kneading dough, the combination with a drum and mechanism for actuating the same, of the flat blades 5' and hollow blades 5 rotating within said drum and mechanism for causing such rotation substantially as set forth.

2. In a machine for kneading dough the combination with a kneading trough 1, constructed to be tilted by hand, of the separate hollow and flat mixing blades 5, 5', mechanism for actuating the pair of blades on opposite sides to revolve in different directions at will substantially as set forth.

3. In a machine for kneading dough the combination with a friction clutch and a driving pulley 14, of a hand wheel 16, operating said clutch to graduate the motion of the mixing blades, gear pinions 11, $11^a$, 10', 8', 7, 7', pinions 11, $11^a$, 22, 21, counter shaft 19, and pinions 21', $11^{a\prime}$, 10, 8, 7, 7' in the way and manner described.

4. In a machine for kneading dough the combination with the friction clutch of wheel 18 mounted on shaft 19, driving pulley 14, gear wheel 17, wheels 18, 21, 22, $11^a$, 10', 8', 7, 7' on the right hand side of trough, shaft 19, pinions 21', $11^{a\prime}$, 10, 8, 7, 7' on the left side, and the mixing blades 5, 5', in the way and manner described.

5. In a machine for kneading dough, for the purpose of tilting the trough 1, by power, the combination of the V-shaped friction wheel 36, spur pinions 35, 18, 17, and driving pulley 14 actuating the same, hand lever 40, eccentrically mounted spindle 33, and friction wheels 39, 29', depending upon the direction in which the drum is tilted, bevel wheels 21', 26, and worm 24, engaging with rack 23, in the way and manner described.

6. In a machine for kneading dough the combination with the hand gear of lever 40 controlling the same, wheel 30, keyed to shaft 31, pinion 29, friction pulley 29', miters 26, 26', worm wheel 24, and the rack 23, for the purpose of tilting the drum in either direction in the way and manner described.

In testimony whereof I have set my hand, in presence of two witnesses, this 21st day of January, 1893.

GEORGE SAMUEL BAKER.

Witnesses:
E. COURTNEY WALKER,
J. M. BOULLON.